(12) United States Patent
Meng et al.

(10) Patent No.: US 7,716,148 B2
(45) Date of Patent: May 11, 2010

(54) PROCESSING MIXED NUMERIC AND SYMBOLIC DATA ENCODINGS USING SCALING AT ONE DISTANCE OF AT LEAST ONE DIMENSION, CLUSTERING, AND A SIGNPOST TRANSFORMATION

(75) Inventors: Zhuo Meng, Broadview Heights, OH (US); Baofu Duan, Cleveland Heights, OH (US); Yoh-Han Pao, Cleveland Heights, OH (US); Ronald J Cass, Cleveland Heights, OH (US)

(73) Assignee: Computer Associates Think, Inc., Islandia, NY (US)

( * ) Notice: Subject to any disclaimer, the term of this patent is extended or adjusted under 35 U.S.C. 154(b) by 1422 days.

(21) Appl. No.: 10/418,659

(22) Filed: Apr. 18, 2003

(65) Prior Publication Data
US 2004/0019574 A1    Jan. 29, 2004

Related U.S. Application Data

(60) Provisional application No. 60/374,064, filed on Apr. 19, 2002, provisional application No. 60/374,020, filed on Apr. 19, 2002, provisional application No. 60/374,024, filed on Apr. 19, 2002, provisional application No. 60/374,041, filed on Apr. 19, 2002, provisional application No. 60/373,977, filed on Apr. 19, 2002, provisional application No. 60/373,780, filed on Apr. 19, 2002.

(51) Int. Cl.
*G06K 9/62* (2006.01)
(52) U.S. Cl. .............................. 706/26; 706/20; 706/21; 706/25

(58) Field of Classification Search .................... 706/26
See application file for complete search history.

(56) References Cited

U.S. PATENT DOCUMENTS

| | | | |
|---|---|---|---|
| 4,193,115 A | 3/1980 | Albus |
| 4,215,396 A | 7/1980 | Henry et al. |
| 4,438,497 A | 3/1984 | Willis et al. |
| 4,649,515 A | 3/1987 | Thompson et al. |
| 4,663,703 A | 5/1987 | Axelby et al. |
| 4,670,848 A | 6/1987 | Schramm |
| 4,740,886 A | 4/1988 | Tanifuji et al. |
| 4,754,410 A | 6/1988 | Leech et al. |
| 4,858,147 A | 8/1989 | Conwell |

(Continued)

OTHER PUBLICATIONS

IBM, IBM Technical Disclosure Bulletin, Sep. 1985, US, (NN85091703).*
Ralambondrainy, A conceptual version of the K-means algorithm, 1995.*

(Continued)

*Primary Examiner*—David R Vincent
*Assistant Examiner*—Nathan H Brown, Jr.
(74) *Attorney, Agent, or Firm*—Baker Botts L.L.P.

(57) ABSTRACT

An apparatus and method for processing mixed data for a selected task is provided. An input transformation module converts mixed data into converted data. A functional mapping module processes the converted data to provide a functional output for the selected task. The selected task may be one or a combination of a variety of possible tasks, including search, recall, prediction, classification, etc. For example, the selected task may be for data mining, database search, targeted marketing, computer virus detection, etc.

41 Claims, 4 Drawing Sheets

U.S. PATENT DOCUMENTS

| | | | |
|---|---|---|---|
| 4,928,484 A | 5/1990 | Peczkowski | |
| 4,972,363 A | 11/1990 | Nguyen et al. | |
| 4,979,126 A | 12/1990 | Pao et al. | |
| 4,994,982 A | 2/1991 | Duranton et al. | |
| 5,023,045 A | 6/1991 | Watanabe et al. | |
| 5,033,006 A | 7/1991 | Ishizuka et al. | 364/513 |
| 5,033,087 A | 7/1991 | Bahl et al. | 381/43 |
| 5,052,043 A | 9/1991 | Gaborski | |
| 5,111,531 A | 5/1992 | Grayson et al. | |
| 5,113,483 A | 5/1992 | Keeler et al. | |
| 5,119,468 A | 6/1992 | Owens | |
| 5,140,523 A | 8/1992 | Frankel et al. | |
| 5,142,612 A | 8/1992 | Skeirik | |
| 5,142,665 A * | 8/1992 | Bigus | 706/44 |
| 5,163,111 A * | 11/1992 | Baji et al. | 706/20 |
| 5,175,678 A | 12/1992 | Frerichs et al. | |
| 5,175,797 A | 12/1992 | Funabashi et al. | |
| 5,247,445 A | 9/1993 | Miyano et al. | |
| 5,311,421 A | 5/1994 | Nomura et al. | |
| 5,335,291 A | 8/1994 | Kramer et al. | |
| 5,349,541 A | 9/1994 | Alexandro et al. | |
| 5,420,937 A * | 5/1995 | Davis | 382/125 |
| 5,442,778 A | 8/1995 | Pedersen et al. | 395/600 |
| 5,483,650 A | 1/1996 | Pedersen et al. | 395/600 |
| 5,485,390 A | 1/1996 | LeClair et al. | |
| 5,682,465 A | 10/1997 | Kil et al. | 395/23 |
| 5,734,796 A | 3/1998 | Pao | |
| 5,761,389 A * | 6/1998 | Maeda et al. | 706/59 |
| 5,790,121 A | 8/1998 | Sklar et al. | 345/356 |
| 5,822,741 A | 10/1998 | Fischthal | 706/16 |
| 5,835,901 A | 11/1998 | Duvoisin, III et al. | 706/19 |
| 5,848,373 A * | 12/1998 | DeLorme et al. | 701/200 |
| 5,848,402 A | 12/1998 | Pao et al. | |
| 5,895,474 A * | 4/1999 | Maarek et al. | 715/514 |
| 5,983,224 A * | 11/1999 | Singh et al. | 707/6 |
| 5,999,927 A | 12/1999 | Tukey et al. | 707/5 |
| 6,003,029 A * | 12/1999 | Agrawal et al. | 707/7 |
| 6,025,843 A | 2/2000 | Sklar | 345/356 |
| 6,032,139 A | 2/2000 | Yamaguchi et al. | 706/13 |
| 6,064,996 A | 5/2000 | Yamaguchi et al. | 706/13 |
| 6,122,628 A | 9/2000 | Castelli et al. | 707/5 |
| 6,128,609 A | 10/2000 | Rose | 706/25 |
| 6,134,537 A | 10/2000 | Pao et al. | |
| 6,134,541 A | 10/2000 | Castelli et al. | 707/2 |
| 6,236,942 B1 | 5/2001 | Bush | 702/14 |
| 6,269,351 B1 | 7/2001 | Black | 706/12 |
| 6,278,986 B1 | 8/2001 | Kamihira et al. | 706/25 |
| 6,289,354 B1 | 9/2001 | Aggarwal et al. | 707/104 |
| 6,327,550 B1 | 12/2001 | Vinberg et al. | |
| 6,496,812 B1 | 12/2002 | Campaigne et al. | 706/16 |
| 6,496,832 B2 | 12/2002 | Chi et al. | 707/102 |
| 6,523,026 B1 | 2/2003 | Gillis | 707/3 |
| 6,629,097 B1 | 9/2003 | Keith | 707/5 |
| 6,691,045 B1 | 2/2004 | Labute | 702/27 |
| 6,697,791 B2 | 2/2004 | Hellerstein et al. | 706/47 |
| 6,759,010 B2 | 7/2004 | Lewis et al. | 422/82.02 |
| 6,950,786 B1 | 9/2005 | Sonneland et al. | 703/2 |
| 7,103,874 B2 | 9/2006 | McCollum et al. | 717/121 |
| 7,321,879 B2 | 1/2008 | Yang et al. | 706/12 |
| 2003/0200075 A1 | 10/2003 | Meng et al. | 703/22 |
| 2003/0200189 A1 | 10/2003 | Meng et al. | 706/26 |
| 2003/0200191 A1 | 10/2003 | Pao et al. | 706/47 |
| 2004/0133355 A1 | 7/2004 | Schneider | 702/19 |
| 2004/0215430 A1 | 10/2004 | Huddleston et al. | 703/2 |

OTHER PUBLICATIONS

Hassoun, Fundamentals of Artificial Neural Networks, 1995, MIT Press, p. 286, 288.*

Orr, Introduction to Radial Basis Function Networks, 1996, Univ. Edinburgh, p. 1, 8, 9, 26.*

Mandayam et al., Application of Wavelet Basis Function Neural Networks to NDE, 1997, IEEE.*

Bouchard, New Recursive-Least-Squares Algorithms for Nonlinear Active Control of Sound and Vibration Using Neural Networks, IEEE Transactions on Neural Networks, vol. 12, No. 1, Jan. 2001.*

Mandayam et al., "Application of Wavelet Basis Function Neural Networks to NDE", 1997.*

Orr, "Introduction to Radial Basis Function Networks", 1996.*

IBM, "IBM Technical Disclosure Bulletin, Sep. 1985, US", (NN85091703).*

Ralambondrainy, "A conceptual version of the K-means algorithm", 1995.*

Hassoun, "Fundamentals of Artificial Neural Networks", 1995.*

Bouchard, "New Recursive-Least-Squares Algorithms for Nonlinear Active Control of Sound and Vibration Using Neural Networks", 2001.*

Patra et al. (Patra), "Functional Link Artificial Neural Network-Based Adaptive Channel Equalization of Nonlinear Channels with QAM Signal", 1995.*

Rassokhin et al., "Nonlinear Mapping of Massive Data Sets by Fuzzy Clustering and Neural Networks", 2000.*

Surajit Chaudhuri, Usama Fayyad and Jeff Bernhardt, "Scalable Classification over SQL Databases", *Proceedings of the 15th International Conference on Data Engineering*, Mar. 23-26, 1999, Sidney, Australia, pp. 470-479.

Dennis T. Lee, Yoh-Han Pao and Dejan J. Sobajic "Dynamic System Control Using Neural Networks", pp. 25-30.

Yoh-Han Pao "Neural Net Computing For Patter Recognition" *Handbook of Pattern Recognition, and Computer Vision*, pp. 125-162 (edited by C.H. Chen, L.F. Pau and P.S.P. Wang).

Bernard Widrow, Narendra K. Gupta, and Sidhartha Maitra (Sep. 1973) "Punish/Reward: Learning With a Critic in Adaptive Threshold Systems", *IEEE Trans. Systems, Man and Cybernetics*, vol. SMC-3, No. 5, pp. 455-465.

John A. Hartigan, (1975) "Interpretation and Evaluation of Clusters", *Clustering Algorithms*, pp. 12-14.

Yoh-Han Pao and Dejan J. Sobajic (1987) "Metric Synthesis and Concept Discovery With Connectionist Networks", *1987 IEEE*, pp. 390-395.

Bernard Widrow and Rodney Winter (Mar. 1988) "Neural Nets for Adaptive Filtering and Adaptive Pattern Recognition", *IEEE Computer*, pp. 25-39.

Bernard Widrow, Rodney G. Winter, and Robert A. Baxter (Jul. 1988) "Layered Neural Nets for Pattern Recognition", *IEEE Trans. Acoustics, Speech, and Signal Processing*, vol. 36, No. 7, pp. 1109-1118.

Yoh-Han Pao, (1989) *Adaptive Pattern Recognition and Neural Networks*.

Andrew G. Barto (1990) "Connectionist Learning for Control", *Neural Networks for Control*, pp. 5-58 (edited by W. Thomas Miller, III, Richard S. Sutton and Paul J. Werbos).

R.D. Coyne and A.G. Postmus (1990) "Spatial Applications of Neural Networks in Computer-aided Design", *Artificial Intelligence in Engineering*, 5(1):9-22.

Kumpati S. Narendra and Kaman Parthasarathy (Mar. 1990) "Identification and Control of Dynamical Systems Using Neural Networks", *IEEE Trans. Neural Networks*, vol. 1, No. 1, pp. 4-27.

Maryhelen Stevenson, Rodney Winter, and Bernard Widrow (Mar. 1990) "Sensitivity of Feedforward Neural Networks to Weight Errors", *IEEE Trans. Neural Networks*, vol. 1, No. 1, pp. 71-80.

Esther Levin, Naftali Tishby, and Sara A. Solla (Oct. 1990) "A Statistical Approach to Learning and Generalization in Layered Neural Networks", *Proc. IEEE*, vol. 78, No. 10, pp. 1568-1574.

Les Atlas, Jerome Connor and Mark Damborg (1991) "Comparisons of Conventional Techniques and Neural Network in Computer-aided Design", Artificial Intelligence in Engineering, 5(1):9-22.

Miodrag Djukanov, Borivoje Babic, Dijan J. Sobajic and Yoh-Han Pao (1991) "Unsupervised/Supervised Learning Concept for 24-Hour Load Forecasting", *Artificial Intelligence in Engineering*, pp. 819-827.

M.M. Gupta and J. Qi (1991) "Fusion of Fuzzy Logic and Neural Networks with Applications to Decision and Control Problems", *Proceedings of the 1991 American Control Conference*, pp. 1:30-31.

Jocelyn Sietsma and Robert J. F. Dow (1991) "Creating Artificial Neural Networks That Generalize", *Neural Networks*, vol. 4, pp. 67-79.

Petros A. Ioannou and Aniruddha Data (Dec. 1991) "Robust Adaptive Control: A Unified Approach", *Proc. IEEE*, vol. 79, No. 12, pp. 1736-1768.

S.A. Billings, H.B. Jamaluddin and S. Chen (1992) "Properties of neural networks with applications to modeling non-linear dynamical systems", *Int. J. Control*, pp. 55(1):193-224.

John Doleac, Jeff Getchius, Judy Franklin and Chuck Anderson (1992) "Nadaline Connectionist Learning vs. Linear Regression at a Lamp Manufacturing Plant", *Proceedings of The First IEEE Conference on Control Applications*, pp. 552-558.

William Finnoff, Ferdinand Hergert, and Hans Georg Zimmerman (1993) "Improving Model Selection by Nonconvergent Methods", *Neural Networks*, vol. 6, pp. 771-783.

Andreas Ikonomopoulos, Lefteri H. Tsoukalas and Robert E. Uhrig (1993) "A Hybrid Neural Networ-Fuzzy Arithmetic Methodology for Performing Virtual Measurements in a Complex System", *Proceedings of the Thirty-Sixth Power Instrumentation Symposium*, pp. 205-212.

Michael Nikolaou (1993) "Neural Network Modeling of Nonlinear Dynamical Systems", *Proceeding of the 1993 American Control Conference*, pp. 1460-1464.

Stevan V. Odri, Dusan P. Petrovacki, and Gorana A. Krstonosic (1993) "Evolutional Development of a Multilevel Neural Network", *Neural Networks*, vol. 6, pp. 583-595.

Yoh-Han Pao and Gwang-Hoon Park (1993) "Neural-Net Computing for Machine Recognition of Handwritten English Language text", *Fundamentals of Handwriting Recognition*, pp. 335-351.

Mujeeb M. Ahmed (1994) "An Integrated Approach to Distributed Intelligent Control", *Proceeding of the Thirty-Seventh Power Instrumentation Symposium*, pp. 1-15.

Timothy J. Graettinger, Naveen V. Bhat and Jeffrey S. Buck (1994) Adaptive Control with NeuCOP, the Neural Control and Optimization Package, *IEEE*, pp. 2389-2393.

Yoh-Han Pao (1994) "Process Monitoring and Optimization for Power Systems Applications", *IEEE International Conference on Neural Networks*, pp. 3697-3702.

Percy P.C. Yip and Yoh-Han Pao (1994) "A Guided Evolutionary Computation Technique as Function Optimizer", *Proceeding of First IEEE Conference on Evolutionary Computation*, pp. 628-633.

Stuart J. Russell and Peter Norvig, (1995) "Learning From Observations", *Artificial Intelligence: A Modern Approach*, pp. 525-562.

Mattias Nyberg and Yoh-Han Pao (1995) "Automatic Optimal Design of Fuzzy Systems Based on Universal Approximation and Evolutionary Programming", *Fuzzy Logic And Intelligent Systems*, pp. 311-366 (edited by H.L. Hua and M. Gupta).

Percy P.C. Yip and Yoh-Han Pao (1995) "Combinatorial Optimization with Use of Guided Evolutionary Simulated Annealing", *IEEE Transaction on Neural Networks*, 6(2):290-295.

Yoh-Han Pao (1996) "Dimension Reduction Feature Extraction and Interpretation of Data With Network Computing", *International Journal of Patter Recognition and Artificial Intelligence*, pp. 10(5)521-253.

Yoh-Han Pao and Zhou Meng (1996) "A Perspective on Funtional-Link Computing, Dimension Reduction and Signal/Image Understanding", *Proceedings of 1996 IEEE Signal Processing Society Workshop*, pp. 213-222.

Michael J. A. Berry and Gordon Linoff, (1997) *Data Mining Techniques For Marketing, Sales and Customer Support*, Chapters 2, 5 and 12, pp. 17-35, 63-93 and 243-285.

Floriana Esposito, Donato Malerba and Giovanni Semeraro, (May 1997) "A Comparative Analysis Of Methods For Pruning Decision Trees", *IEEE Transaction on Pattern Analysis and Machine Intelligence*, 19(5):476-491.

Byung Hwan Jun, Chang Soo Kim, Hong-Yeop Song and Jaihie Kim, (Dec. 1997)"A New Criterion in Selection and Discretization of Attributes for the Generation of Decision Trees", *IEEE Transaction on Pattern Analysis and Machine Intelligence*, 19(12):1371-1375.

Yoh-Han Pao and Chang-Yun Shen (1997) "Visualization of Pattern Data Through Learning of Non-linear Variance-Conserving Dimension-Reduction Mapping", *Pattern Recognition*, 30(10):1705-1717.

Paul S. Bradley, Usama M. Fayyad and Cory A. Reina, (Jun. 1998) "Scaling Clustering Algorithms to Large Databases", Proc. 4$^{th}$ Int'l Conf. Knowledge Discovery & Data Mining, pp. 9-15.

Yoh-Han Pao and Zhou Meng (1998) "Visualization and the understanding of multidimensional data", *Engineering Applications of Artificial Intelligence*, 11:659-667.

Sholom M. Weiss and Nitin Indurkhya (1998) *Predictive Data Mining: A Practical Guide*, pp. 119-123 and 136-142.

Michael J. A. Berry and Gordon Linoff, (2000) *Mastering Data Mining the Art and Science of Customer Relationship Management*, pp. 59-64 and 111-121.

Timo Koskela (2000) "Decision Trees", http://www.hut.fi/~timoko/treeprogs.html.

Zhou Meng and Yoh-Han Pao (2000) "Visualization and Self-Organization of Multidimensional Data through Equalized Orthogonal Mapping", IEEE Transaction on Neural Networks, pp. 11(4):1031-1038.

Guttman, R-Trees A Dynamic Index Structure for Spatial Searching (11 pgs.), 1984.

Riloff et al., E. Classifying Texts Using Relevancy Signatures, Proceedings of the Workshop on Speech and Natural Language, Feb. 1992, pp. 224-229.

Hamer et al., P. An Artificial Immune System Architecture for Computer Security Applications, IEEE Transactions on Evolutionary Computation, vol. 6, No. 3, Jun. 2002, pp. 252-280.

Neugents Are On The Loose, The E-Business Adviser, Apr./May 2000, at 1.

Raisinghani, et al., An Automated Executive and Managerial Peformance Monitoring, Measurement and Reporting System, Journal of Electronic Commerce Research, vol. 2, No. 1, 2001, pp. 23-31.

Computer Associates, Office of the CTO, White Paper: Comprehensive eBusiness Intelligence, Nov. 26, 2001, pp. 1-10.

"Pythia—The Neural Network Designer", Runtime Software, 2000.

Javier Herrero et al., A Hierarchical Unsupervised Growing Neural Network for Clustering Gene Expression Paterns, Bioinformatics, vol. 17, No. 2, 2001, pp. 126-136.

Hassoun, Fundamentals of Artificial Neural Networks, 1995, MIT Press, (6 pg).

Fahlman et al., "The Cascade-Correlation Learning Architecture", 1990, School of Computer Science.

Hassoun, "Fundamentals of Artificial Neural Networks", 1995, pp. 103-106 (3 pg).

Hai-Lung Hung et al., "Dynamic Hierarchical Self-Organizing Neural Networks", 1994, 0-7803-1901-X/94 IEEE.

Henrique et al., "Model Structure Determination in Neural Network Models", 2000, Elsevier Science Ltd.

Wlodzislaw Duch et al., "Survey of Neural Transfer Functions", 1999, Neural Computing Surveys 2, 163,-212 .

William H. Hsu and William M. Pottenger and Michael Weige and Jie. Wu and Ting-Hao Yang, Genetic Algorithms for Selection and Partitioning of Attributes in large-scale Data Mining Problems, Data Mining with Evolutionary Algorithms: Research Directions, pp. 1-6, AAAI Press, Jul. 18, 1999.

Ersoy, O.K. et al., "Parallel, Self-Organizing, Hierarchical Neural Networks" IEEE Transactions on Neural Networks, IEEE Inc., New York, US, vol. 1, No. 2, Jun. 1990, pp. 167-178, XP 000133516, ISSN: 1045-9227.

PCT Notification of Transmittal of International Search Report orthe Declaration, PCT/US 03/11713, Reference 0655/67092; mailed Nov. 8, 2004, Int'l filed Apr. 15, 2003, and PCT International Search Report (7 pgs).

PCT Notification of Transmittal of International Search Report or the Declaration, PCT/US 03/11829, Reference 0655/65206; mailed Aug. 31, 2004, Int'l filing date Apr. 17, 2003, and PCT International Search Report (7 pgs).

U.S. Patent Office Communication dated Oct. 21, 2008, U.S. Appl. No. 10/402,519 by Yoh-Han Pao filed U.S. Appl. No. 10/402,519 (27 pages), Oct. 21, 2008.

European Patent Office communication from the Formalities Officer in re Application No. 03 718 450.4-1243, dated May 15, 2009 (3 pages).

\* cited by examiner

US 7,716,148 B2

PROCESSING MIXED NUMERIC AND SYMBOLIC DATA ENCODINGS USING SCALING AT ONE DISTANCE OF AT LEAST ONE DIMENSION, CLUSTERING, AND A SIGNPOST TRANSFORMATION

CROSS-REFERENCE TO RELATED APPLICATIONS

This application claims the benefit of the following co-pending U.S. provisional applications:

(a) Ser. No. 60/374,064, filed Apr. 19, 2002 and entitled "PROCESSING MIXED NUMERIC AND/OR NON-NUMERIC DATA";

(b) Ser. No. 60/374,020, filed Apr. 19, 2002 and entitled "AUTOMATIC NEURAL-NET MODEL GENERATION AND MAINTENANCE";

(c) Ser. No. 60/374,024, filed Apr. 19, 2002 and entitled "VIEWING MULTI-DIMENSIONAL DATA THROUGH HIERARCHICAL VISUALIZATION";

(d) Ser. No. 60/374,041, filed Apr. 19, 2002 and entitled "METHOD AND APPARATUS FOR DISCOVERING EVOLUTIONARY CHANGES WITHIN A SYSTEM";

(e) Ser. No. 60/373,977, filed Apr. 19, 2002 and entitled "AUTOMATIC MODEL MAINTENANCE THROUGH LOCAL NETS"; and (f) Ser. No. 60/373,780, filed Apr. 19, 2002 and entitled "USING NEURAL NETWORKS FOR DATA MINING".

TECHNICAL FIELD

This application relates to computationally intelligent data processing techniques such as artificial neural networks, cluster analysis, self-organization, visualiza-tion and other intelligent data processing techniques. In particular, the application relates to a method and apparatus for processing mixed numeric and/or non-numeric data, using one or a combination of such techniques.

DESCRIPTION OF RELATED ART

Artificial neural network (neural net) and other artificial intelligence techniques have been used for processing pattern formatted information and data in assorted application areas. Some have suggested that neural nets may be expeditiously applied to processing of numeric pattern data but they are not particularly suitable for non-numeric data processing, without special and complex adaptations for context.

Conventional symbolic processing techniques generally are concerned with concepts and qualitative relationships, which depend on, in part, discerning structure within the non-numeric pattern such as in rule-based or case-based reasoning systems. There are many instances, however, in which it is desired to identify and represent relationships between bodies of mixed numeric and/or non-numeric data. For example, a wealth of information represented in the form of mixed numeric and/or non-numeric data is available in electronic media, such as on the Internet (or other wired or wireless computer/telecommunicative network). However, conventional symbolic processing techniques generally are not suitable for processing such mixed data form of information.

Further, conventional numeric or symbolic processing techniques often pre-select one or more pattern structure formats for processing incoming data. As a result, such techniques are not suitable for processing symbolic patterns having a structure other than the preselected structures.

There exists a need for symbolic processing methodologies and systems that avoid at least the above-mentioned deficiencies of conventional symbolic processing techniques.

SUMMARY

The application provides a method and apparatus for processing mixed numeric and/or non-numeric data (referred herein as "mixed data") for a selected task. The method for processing mixed data for a selected task, according to an embodiment, includes converting mixed data into converted data, and processing the converted data to provide a functional output for the selected task.

The apparatus for processing mixed data for a selected task, according to an embodiment, includes an input transformation module adapted to convert mixed data into converted data, and a functional mapping module adapted to process the converted data to provide a functional output for the selected task. The apparatus may be a computer program stored on a computer readable medium and/or transmitted via a computer network or other transmission medium.

According to one embodiment, the mixed data is transformed into converted data through a signpost transformation. Cluster centers are set as reference points and distances from a mixed data to the respective reference points correspond to dimensions of the converted data space. The input transformation module may be trained through clustering of a mixed data training set. The input transformation module may use a hierarchical k-means methodology or a hierarchical k-medoids methodology for determining cluster centers. The input transformation module may also use a supervised learning methodology in determining the cluster structure.

According to another embodiment, the mixed data is transformed into converted data through an encoding methodology. The mixed data may include consumer profile information.

The input transformation module and the functional mapping module may comprise respective layers of a neural network. The converted data may be in a numerical representation. The mixed data may correspond to text.

The input transformation module may learn to organize unstructured data patterns into sets corresponding to a plurality of nodes, and respective outputs of the nodes correspond to the converted data. The learning may be unsupervised. Each node may have an associated cluster annotation function.

The functional mapping module may include a computational model with at least one basis function, and parameters of the basis function are adjusted as the functional mapping module learns a training set of sample data patterns corresponding to the selected task. The functional mapping module may use a regression technique for adjusting the parameters of the basis function. The basis function may include a sigmoid, a wavelet, a radial basis function and/or a polynomial.

The functional mapping module may include a functional link net. The functional link net may be orthogonal. The learning by the functional mapping module may be supervised. The functional mapping module may include a non-linear feed-forward net, and the feed-forward net may learn by back-propagation of error. Alternatively, the learning by the functional mapping module may be by a recursive least squares estimation method such as the orthogonal least squares methodology.

The selected task may be one or a combination of a variety of possible tasks, including visualization, search, recall, prediction, classification, etc. For example, the selected task may be applied to data mining, database search, targeted marketing and/or computer virus detection.

BRIEF DESCRIPTION OF THE DRAWINGS

The features of the present application can be more readily understood from the following detailed description with reference to the accompanying drawings wherein.

DETAILED DESCRIPTION

This application provides intelligent methodologies and systems, which may include one or a combination of artificial intelligence and neural net techniques, for processing mixed data for a selected task. The methodologies according to the present application may be used with tasks, such as visualization, search, recall, prediction and classification. Such tasks may be found in technological and business fields, such as information management, enterprise management, storage management, network infrastructure management and process management. The present application may also be deployed in other technological and business fields, such as data mining, computer virus detection, targeted marketing, medical diagnosis, speech and handwriting recognition, etc.

Figure 1A:
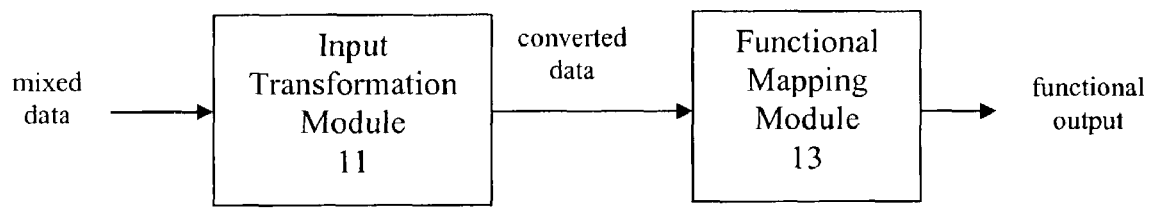
FIG. 1A shows a block diagram for an apparatus for processing mixed data for a selected task, in accordance with one embodiment of the present application.

An apparatus for processing mixed data for a selected task, in accordance with an embodiment, is described with reference to FIGS. 1A and 1B. Apparatus 10 includes an input transformation module 11 and a functional mapping module 13. Apparatus 10 may be a computer program stored in a computing system's memory, on a computer readable medium and/or transmitted via a computer network and/or other transmission media in one or more segments, which is executable on the computing system.

Figure 1B:
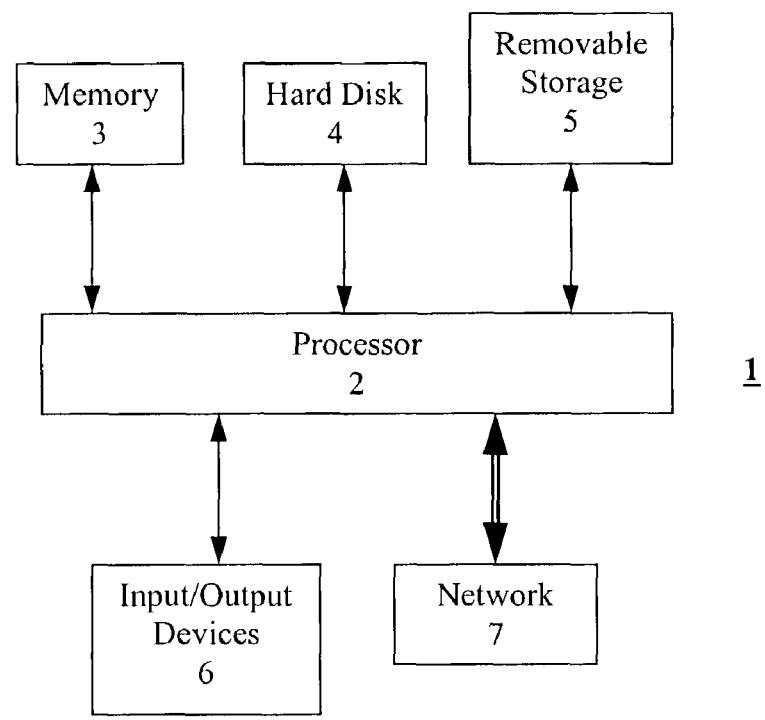
FIG. 1B shows a block diagram of a typical computing system or computer in which a software embodiment of the apparatus shown in FIG. 1A may reside and/or execute.

FIG. 1B illustrates a computing system or computer 1 on which computer executable code such as a software embodiment of the apparatus 10 may execute and/or reside. The computing system 1 comprises a processor 2, memory 3, hard disk 4, removable storage drive 5 [for reading/accessing removable storage media, such as floppy disks, compact discs, digital versatile discs (DVD), etc.], I/O devices 6 (for example, display, keyboard, mouse, microphone, speaker, etc.), and a wired or wireless connection to a network 7. The network 7 may be, for example, a local area network (LAN), a wide area network (WAN), a storage area network (SAN), an intranet, an extranet, the Internet, and/or any other computer and/or telecommunicative networks, as well as any combinations of such networks. The computer 1 may be any of the computing devices/systems known in the art, such as, for example, a personal computer, a laptop, a workstation computer, a mainframe computer, etc. Mixed data to be processed may be retrieved from, for example, hard disk 4 and/or a removable storage medium that may be read/accessed through removable storage drive 5, and/or another database or data source through the network 7. Also, the apparatus 10 may be downloaded to the computer system 1 through the network 7. The processor 2, memory 3 and hard disk 4 may be suitably (and as typically) configured to provide computing and storage capacities for performing artificial intelligence and neural net methodologies. The components of the computing system 1, other than apparatus 10, are conventional and therefore, in the interest of clarity, is not discussed in detail herein.

In one embodiment, the input transformation module 11 operates in a data transformation mode in which mixed data is transformed or converted into converted data. The input transformation module 11 may include trainable functionality, which may be in the form of a clustering structure or other trainable module. For example, the trainable module may utilize one or a combination of clustering techniques. An embodiment of the input transformation module 11 which utilizes clustering techniques is discussed herein below.

If the module 11 includes trainable functionality, then the module may be capable of operating in two modes: a training mode and a data transformation mode. In the training mode, the input transformation module 11 learns a transformational relation (for example, function, mapping, etc.) between samples of mixed data and converted data to which the samples are transformed. As noted above, in the data transformation mode mixed data is transformed or converted into converted data. These modes are described in more detail herein below.

The functional mapping module 13 utilizes one or more functions $G(x)$ to provide a functional representation of a mapping of converted data to at least one functional output corresponding to the specific selected task. Examples of such functions include linear, polynomial, trigonometric or Gaussian functions. The selection of a particular function to be utilized may be, based at least in part on the specific task.

The functions are preferably orthogonal and are adjusted as the functional mapping module 13 learns a training set of sample patterns corresponding to a selected task. The functional mapping module 13 may be, for example, a functional link network (FLN) or an orthogonal functional link network (OFLN). Examples of FLNs are described in commonly owned U.S. Pat. Nos. 4,979,126, 5,734,796, 6,134,537 and 6,212,509 which are incorporated herein in their entirety by reference. An example of an OFLN is described in commonly owned U.S. patent application Ser. No. 10/374,406 "AUTOMATIC NEURAL-NET MODEL GENERATION AND MAINTENANCE".

Other techniques that provide a functional representation of the mapping of converted data to functional output are also contemplated. Examples of such alternative techniques include wavelets and polynomial networks, which provide a functional representation in which parameters are estimated.

In addition, the functionality implemented for the functional mapping module 13 may include a learning component. For example, the functional mapping module 13 may use, with a training set, a recursive linear regression technique that adjusts the parameters of the one or more functions.

Figure 2:
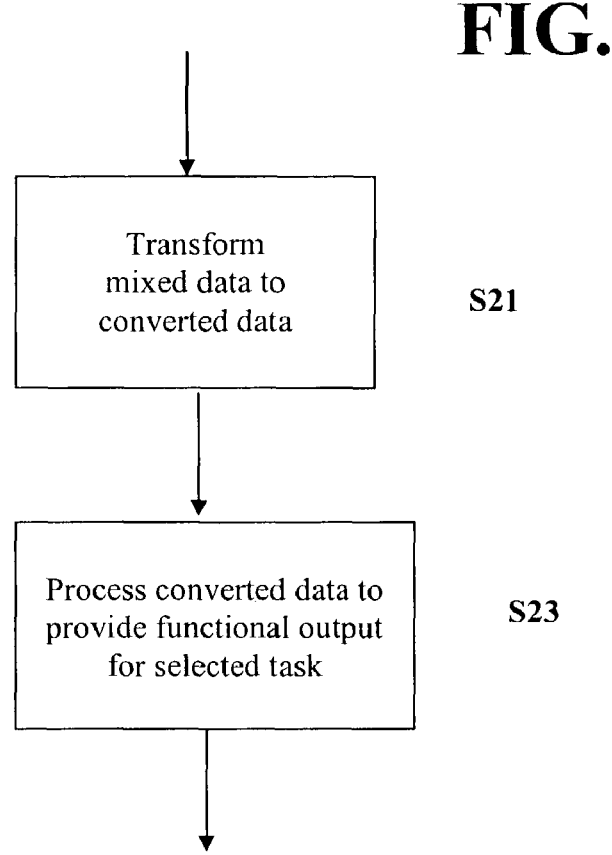
FIG. 2 shows a flow chart for a method of processing mixed data for a selected task, in accordance with one embodiment of the present application.

An exemplary method of processing mixed data for a selected task, in accordance with one embodiment of the present application, is described with reference to FIGS. 1 and 2. The input transformation module 11 transforms or converts the mixed data into converted data (step S21). The converted data is then processed by the functional mapping module 13 to provide at least one functional output (step S23).

In a practical approach, it is desirable to reduce the complexity of raw, mixed data as a precursor to extracting information useful for a selected task. To reduce the complexity of the mixed data, the input transformation process may utilize various methodologies. For example, the input transformation process may use clustering or other self-organizing techniques, such as self-organizing map (SOM), to transform the data pattern. Such methodologies may use information such as the Euclidean distance or distance based on an alternative metric between data points to infer how the data points are distributed in a multi-dimensional data space. A result of these methodologies is to describe large amounts of data patterns more concisely with cluster features/attributes or some other information associated with the distributions of data patterns. Methodologies for the input transformation process may include other dimension-reduction techniques. A non-exhaustive list of dimension-reduction techniques may include the linear principal component analysis (PCA) through the Karhunen-Loève (K-L) transform, neural-net implementations of PCA, SOM, the auto-associative mapping technique, the generative topographic mapping (GTM), the nonlinear variance-conserving (NLVC) mapping and the equalized orthogonal mapping (EOM), which are described in commonly owned U.S. Pat. Nos. 5,734,796, 6,134,537 and 6,212,509, incorporated herein in their entirety by reference, as well as nonlinear mapping and its neural-net implementation, and the distance ratio constrained (DRC) mapping.

The input transformation process may have the effects of, or facilitate, classification and/or feature extraction. The task of classification typically includes partitioning the data pattern space into separate regions corresponding to distinct respective classes. A class is a set of patterns having certain traits, attributes or characteristics in common (which are also referred either alone or in any combination herein as "features", "traits", "attributes" and "characteristics"). Therefore, the data patterns in a region may be classified as having a corresponding feature. Further, a discriminant function, such as linear, quadratic, sigmoidal and/or Gaussian-based functions, may be used to define boundaries between class regions. Therefore, it may be determined whether a pattern belongs in a selected class by applying the corresponding discriminant function to the pattern.

The feature extraction methodology typically includes minimizing the number of features to describe data patterns in a manner relevant to a selected task to one or a set of extracted features. Preferably, the set of extracted features adequately characterizes the relevant traits, attributes and/or characteristics of the data patterns. Feature extraction may be regarded as a data reduction methodology that retains vital features of the data patterns while eliminating undesirable interference from irrelevant traits, attributes and characteristics, which tends to ease the decision-making process downstream. In some instances, classes may be annotated with their corresponding features as class labels.

As noted above, the input transformation module may include, in accordance with one embodiment, a trainable intelligent module having at least two modes of operations: a training mode and a data transformation mode.

In training mode, the input transformation module 11 learns data pattern classes. During training a set of representative samples of the types of data patterns that may be encountered in, or otherwise relevant to, a selected task is presented to the module 11. If the training is supervised (for example, sample patterns are supplied along with corresponding expected/desired module output as the training set), each sample (also referred herein as "training sample") in the set of representative samples (also referred herein as a "training set") may include a sample data pattern plus a class label annotation (or other target information, such as traits, attributes and/or characteristics associated with the sample pattern) for the sample pattern. If the training is unsupervised, such as when the input transformation module 11 uses a clustering technique, no features are provided in the training set. If enough sample patterns within the classes of interest are provided during training mode, the module 11 may learn sufficiently to characterize the classes so that, in the data transformation mode, raw data patterns that are input into the module 11 can be reliably and repeatably classified across such classes.

For example, the input transformation module 11, using clustering (or other self-organizing) methodologies, may learn to classify the data pattern classes with a training set of sample data patterns. After training, the input transformation module 11 has M clusters, which each typically has (but need not necessarily have) an associated annotation (of traits, attributes and/or characteristics, or other features). The annotation may be obtained through training with an annotated training set or by annotation of the clusters upon completion of training.

When a mixed data pattern is fed to the input transformation module 11 in the data transformation mode, the data pattern is evaluated by each of the M clusters (e.g., the distance to each cluster center is determined), and the results of the evaluations may be output as structured data having M elements corresponding to the M cluster evaluations. Thus, the space of mixed data patterns is transformed (or converted) into a second space structured in terms of the features corresponding to the M clusters in the input transformation module 11.

Next, the M-element wide structured data is supplied to the functional mapping module 13. A neural-net type functional mapping module may comprise one or more basis functions $G(x)$. The basis functions may be linear, polynomial, trigonometric or radial-basis functions. Selection of the basis functions is task specific. The basis functions are preferably orthogonal. Parameters of the basis functions are adjusted as the functional mapping module learns a training set of sample patterns corresponding to the selected task.

The functional mapping module may be a functional link net, which is described, for example, in U.S. Pat. Nos. 5,734,796, 6,134,537 and 6,212,509. The functional link net is suitable since it can support many functionalities (and tasks). Other techniques which include a functional representation in which parameters are estimated (such as wavelet, polynomial nets, etc.) also may be used. Such techniques may have a learning component. For example, the functional mapping module may use a recursive linear regression technique with a training set for adjusting the parameters of the basis functions.

Figure 3:
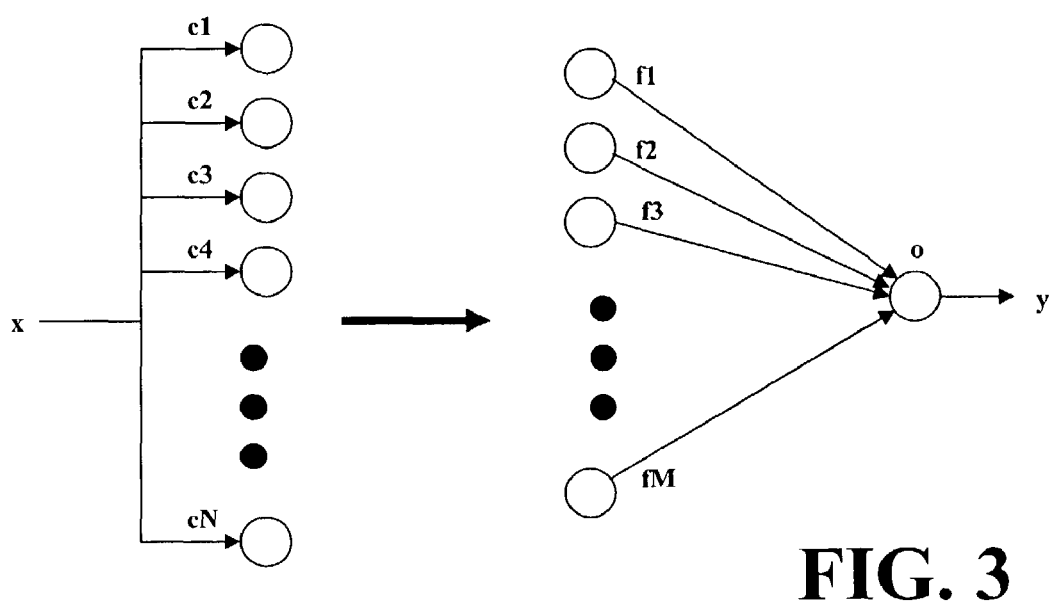
FIG. 3 shows a block diagram for an apparatus for processing mixed data for a selected task, in accordance with another embodiment of the present application.

An exemplary embodiment in which the input transformation module and the functional mapping module comprise respective layers of a neural network is shown in FIG. 3.

The input transformation layer is trained through clustering of a mixed data training set, to form N cluster nodes $c_1 \ldots c_N$. The cluster nodes may be formed using an unsupervised learning methodology. Each node may have an associated cluster annotation function. Alternatively, the nodes are annotated upon completion of training. During data transformation mode, mixed data pattern x is fed to the cluster nodes $c_1 \ldots c_N$. The cluster nodes transform the data pattern x into N-component converted data.

The converted data is fed to a functional link net which is a feed-forward flat (single layer) net with radial-basis function nodes f1 ... fM. Parameters of the basis function are adjusted as the functional link net learns a training set of sample patterns associated with the selected task. The learning by the functional link net may be by back-propagation of error or by another supervised technique known in the art. Alternatively, the learning may be by a recursive least squares estimation method, such as the orthogonal least squares methodology, or by another supervised learning technique known in the art.

The tools and methodologies described above may be adapted for any of several tasks.

For example, the selected task may be search of a database categorized into N classes or an information network categorized into N domains, or recall of appropriate key words/terms, based on unstructured input terms. The input transformation module in training may be trained under supervision to associate each sample training pattern with a corresponding class/domain. For example, each sample in the training set may have an associated class/domain label. In data transformation mode, the transformation module converts a mixed data search pattern into an N-element output (converted data), with each output element representing a measure of similarity/relevance between the search pattern and the class/domain associated with the output element. The functional mapping module is trained to process the N-element converted data, and recommend, for example, one or more of the N classes/domains or key words/terms associated therewith to be searched.

Another selected task may be classification and/or prediction, such as for targeted marketing. For example, the input transformation module may be trained, supervised or unsupervised, with training samples extracted from a database of mixed data including or describing consumer buying patterns. In data transformation mode, the input transformation module compares a mixed data input pattern (associated with or extracted from, perhaps, a subject consumer's profile) with N buying traits/tendencies (for example, associated with product groups), learned by the module during training, and provides an N-element output (converted data) representing measures of similarity and/or relevance between the input buying profile pattern and the N buying traits/tendencies. The functional mapping module may be trained to process the N-element converted data, and (i) classify the consumer's profile under one or more of the buying traits/tendencies, and/or (ii) predict, for example, additional article(s) and/or service(s) that the subject consumer may likely purchase (and therefore advertisements/marketing of the article/service may be targeted to the subject consumer).

In yet another example, the tool may be adapted for computer virus detection software. The input transformation module may be trained with sample mixed data patterns extracted from corrupted portions of infected computer files/code (for example, a Visual Basic Script file, a MS Word macro, etc.), to form clusters with corresponding virus traits/characteristics. In data transformation mode, the input transformation module compares a mixed data input pattern extracted from a scanned file/code with each of the clusters, learned by the module during training, and provides an output (converted data) representing measures of similarity and/or relevance between the input data pattern and the clusters associated with respective virus traits. The functional mapping module is trained to process the converted data, and determine (a) if the extracted data pattern likely corresponds to infection by one or more viruses, and (b) if infected, an identity or description of the virus.

Figure 4:
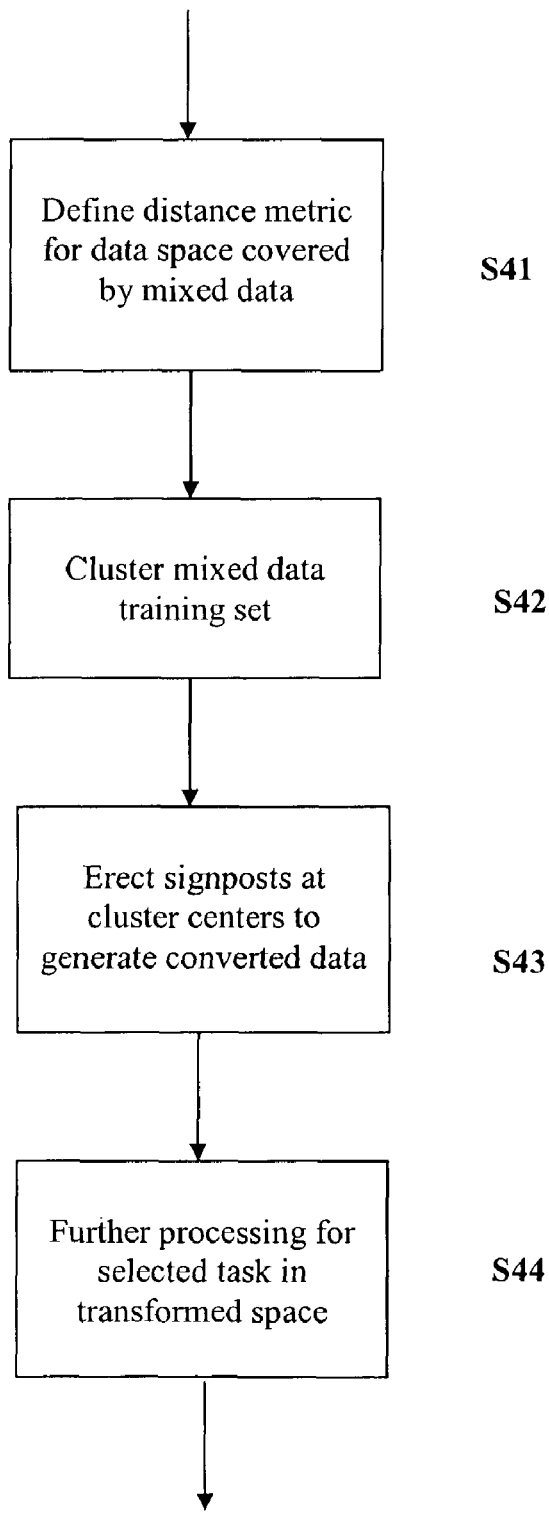
FIG. 4 shows a flow chart for a method, in accordance with another embodiment, of processing mixed data for a selected task.

A method (corresponding to FIG. 4) for processing mixed numerical and non-numerical (e.g., symbolic) data for a selected task, according to another embodiment which uses a signpost transformation for transforming mixed data to converted data in a space in which the dimensions correspond to distances between a data point and signposts, may include the following steps:
 (a) define a distance metric for a data space covered by the mixed numerical and non-numerical data, which allows a distance between any two points in the data space to be computed [step S41];
 (b) cluster a mixed data training set based on the defined metric (depending on the clustering technique used, a methodology for computing, for each cluster, a corresponding centroid may be defined too; the results from clustering may be used directly depending on the nature of the problem) [step S42];
 (c) use the cluster centers as a set of reference points and put up signposts at the reference points so that distance to a reference point spans a dimension in the transformed space [step S43]; and
 (d) use neural-net and/or other artificial intelligence type methodologies to further processing in the transformed space for a selected task (for example, a neural net may be used to build a model for classification of the data points) [step S44].

Distance between two data points may be determined by a combination of the distances within respective dimensions of the data space. Although each field in the raw data may be treated as a dimension, in many instances, some fields have closer relationship than others and they may be grouped together to form a composite field which serves as a single dimension. Combining fields together can reduce the number of dimensions and may also aid the definition of the distance metric. For example, when comparing relative distances between locations on earth, a suitable measure of relative distance between two locations may be the great circle distance based on longitude values and latitude values of the locations, in place of the straight-line distance between the two locations.

Distance within each dimension may be scaled to avoid accidentally giving more weight to one dimension. For mixed data, one technique is, for each dimension, to scale distance within the dimension to the interval [0.0, 1.0]. When distances in all respective dimensions are combined to compute a distance between two points, additional weights may be assigned to certain dimensions to emphasize them more than others. Thus, dimensions which are composite fields may be afforded proper treatment and prior knowledge regarding the relative importance of selected fields may be applied.

For a numerical dimension, the distance metric may be set by default to Euclidean distance, which is the distance metric most frequently used, in order to reduce the amount of work. However, depending on the nature of the numerical data, a customized distance function also may be used. The longitude-latitude example mentioned above is one such case. Other examples of numerical dimensions in which alternative measures may be used include, for example, angle, date and time.

One thing to note is that some seemingly numerical fields (for example, a social security number) may actually be considered as symbolic. In general, if it is the sequence of the digits, rather then the value of the number, that is important, the field should be considered as symbolic.

For a dimension covering symbolic data, the most likely distance metric is probably based on matching symbols. If a field of data points which corresponds to this dimension may be considered as a set, the following may be used as a distance metric between symbol sets A and B from two respective data points:

$$d = \frac{|A \cup B| - |A \cap B|}{|A \cup B|} \quad (1)$$

Equation (1) represents a simple symbol match scaled to satisfy the mathematical requirements of a distance metric. It works well when the dimension is composed of fields that have simple nominal values (for example, a dimension "car color" formed by the interior and exterior colors of a car in which only a limited number of colors are available from the manufacturer).

The above metric (Equation 1) may be generalized, if the value of a field cannot be considered as a simple set. One example is a free text field in the problem of information classification. Since there are repeated words and some words may carry a larger weight for classification purposes, weights for each unique symbol may be introduced. One method, which is compatible with Equation (1), using weights is proposed in Equation (2) as follows:

$$d = \frac{\sum_{i}^{A} w_{Ai} + \sum_{j}^{B} w_{Bj} - \sum_{k}^{A \cap B} (w_{Ak} + w_{Bk})}{\sum_{i}^{A} w_{Ai} + \sum_{j}^{B} w_{Bj} - \frac{1}{2}\sum_{k}^{A \cap B} (w_{Ak} + w_{Bk})} \quad (2)$$

where $w_{Ai}$ (and $w_{Ak}$) represents the weights associated with symbols Ai (and Ak) in symbol set A, $w_{Bj}$ (and $w_{Bk}$) represents the weights associated with symbols Bj and Bk in symbol set B. When each of the weights is equal to one, Equation (2) is reduced to the following:

$$d = \frac{|A| + |B| - 2|A \cap B|}{|A| + |B| - |A \cap B|} \quad (3)$$

Equation (3) is equivalent to Equation (1) since the following is true:

$$|A \cup B| = |A| + |B| - |A \cap B|$$

More elaborate distance metric may also be used for text processing. For example, when searching a database of textual information, it may be desired to keep a sequence of cue words. In this case, a penalty may be introduced if the sequence is broken, even if all cue words are present. This may drastically reduce the number of hits which are less interesting or not relevant at all.

The following steps may be easily expanded to work on other types of non-numerical data, if a reasonable distance metric can be defined.

Once the distance between two data points of mixed type can be computed, a set of such data points may be analyzed by clustering. The k-medoids technique may be used directly. The technique is similar to the k-means technique. The difference is that instead of using the average of the data points in the cluster as the center of the cluster, which is the case for k-means, the k-medoids technique uses the most centrally located data point in the cluster as the cluster center. The most centrally located data point is a data point that has a sum of distances to all other data points in the cluster that is minimal amongst the points in the cluster.

The k-medoids technique has the advantage that it uses the distances between the data points to perform the clustering and is less sensitive to out-liers. However, the k-medoids technique is computationally intensive for large data set since the step to identify the medoid is on an order of $O(n^2)$ complexity. For large data sets, samplings may be performed to reduce the amount of computation. The CLARA (Clustering LARge Applications) and CLARANS (Clustering Large Applications based upon RANdomized Search) techniques are such extensions for the k-medoid technique.

If a methodology to compute the centroid can be defined, the more efficient k-means technique may be used in the clustering process. For a dimension of numerical data, the centroid may be simply the average values of all fields in this dimension. For a dimension of symbolic data, the centroid may be a selected pattern that is the most representative of the cluster. What constitutes the most representative pattern may be dependent on the nature and format of the data.

Out of all the symbol values, the symbol values that occur the most frequently if Equation (1) is used as distance metric, or have the largest total weights if Equation (2) is used as distance metric, are the most representative of the data. For cases in which Equation (1) is a suitable distance metric, a heuristic may be drawn to drop the less frequently occurring symbol values. The heuristic may be related to the average number of symbols contained in a pattern or a frequency threshold. For cases in which Equation (2) is a suitable distance metric, the symbolic nature of the values is less of a problem since the weights can be averaged. Still, for cases in which the number of symbols is large, free text for example, the size of the centroid may become too large. Therefore, some kind of cut-off criterion based on relative weights of the symbol values may be used.

In addition to partitioning methodologies such as the k-means and k-medoids techniques, other clustering techniques such as density-based methodologies may be applied to perform the clustering. Since different clustering techniques use different parameters and the results of the clustering may be quite sensitive to the setting of the parameters, a particular clustering technique may be more suitable than others for a specific problem.

The results of the clustering may be used directly for purposes of understanding (through visualization) the structure of the data, data compression, associative recall, as well as other tasks. The cluster results may also be used as the basis for converting the symbolic data into a numerical form, so that techniques for numerical data may be used for further processing as discussed below.

Many techniques work only on numerical data since they contain functions that only take numerical inputs. Standard hidden layer neural net is one such example. Since the weights for the links work only on numerical data and the activation function only takes numerical input, this type of techniques cannot be directly applied to symbolic data and thus mixed data.

To apply existing neural net technology to symbolic or mixed data, the data is transformed to a numerical form. The transformation may be performed through encoding. One methodology is to convert every symbolic value into a dimension and use 1 to indicate that symbol appears in the pattern, 0 otherwise. This works well when the number of possible symbols is small. For large numbers of symbols as in the case of free text, the number of dimensions, and thus the complexity of the problem, may be difficult to handle.

A signpost transformation may be applied in the conversion process and the cluster centers are natural positions for the placement of the signposts. Each symbolic data point is then converted to numerical form by computing its distances to all of the signposts and those distances form the coordinates of this data point in the transformed space.

The main advantage of this signpost transformation over the encoding technique is that the number of dimensions in the transformed space is independent of the number of possible symbols in the data set. With hierarchical clustering or several sets of clustering results with different parameters, it is also easy to dynamically adjust the levels of details, that is, the complexity of the transformed space to suit the needs for methodologies downstream in the data path (see commonly owned U.S. patent application Ser. No. 10/402,519, entitled "VIEWING MULTI-DIMENSIONAL DATA THROUGH HIERARCHICAL VISUALIZATION"). Since the coordinates are distances, this method of transformation also captures the structure of the data set.

Compared with the encoding technique, a signpost transformation is opaque in the sense that it is generally irreversible and the original and transformed spaces are not symmetric in terms of distance definition. Distance between two points in the transformed space is the "distance of distances to signposts" in the original space. This difference may cause methodologies based on distance to be greatly affected by the symbolic clustering results. Such methodologies may be used only if the intention is to study the clustering structure.

However, methodologies based on non-linear transformations, such as neural nets, can absorb such a difference and may even benefit from it. When used in conjunction with a neural net, a signpost transformation is equivalent to a functional-link layer of a neural net. Before supervised learning of a mixed data set commences, the targets may be transformed into numerical form (if they are not already in that form). An encoding technique may be used for this purpose since the transformation is reversible in this case.

To be able to better utilize the available dynamic control of the signpost transformation, it is preferable (although not necessary) to use a self-adapting technique for supervised learning, such as the Orthogonal Least Squares (OLS). The OLS technique may be applied to a linear functional-link net structure and may dynamically add nodes until the results meet certain training criterion. For other type of net structure, such as hidden layer net, the traditional back-propagation or conjugate gradient learning techniques may be used, although these techniques use full retrain if the net structure changes.

In addition to building supervised learning models, other studies of the data such as visualization may also be carried out downstream of the signpost transformation. Some visualization techniques, such as the equalized orthogonal mapping, distance ratio constrained mapping or auto-associative mapping, use a neural net with specially formatted targets, so they can be easily applied with the signpost transformation. Even methodologies such as self-organizing map, which uses distances, may still be used since visualizing the clustering structure, and thus the data, is the goal.

To illustrate the process of data analysis using the technique described above, a set of customer profile and purchase data from an insurance company may be used as an example. This is a mixed numerical and symbolic data set. The numerical fields are customer age, salary and retirement plan contribution. The symbolic fields are sex and the list of insurance products the customer bought. The goal is to predict if a customer may be interested to buy a specific new insurance product.

A pattern data set (for example eight hundred customer records) may be split into a training data set and a test data set (for example, two-thirds for training and the rest for testing). The pattern data set may be pre-processed by first encoding the data. To limit the number of fields, only a selected number (for example, fourteen) of the most popular products are identified and the rest are put under the field "other" (resulting in fifteen product fields in total). The symbolic field "customer sex" is converted into three fields corresponding to male, female and unknown. A numerical modeling approach, such as OLS methodology can be used to build a model on the encoded data to predict whether a customer might buy a new product.

Since only the encoded form of the data is available, the mixed data set is created by reducing the three customer sex fields and the fifteen product fields back into one. The data set is first clustered. For each cluster, based on whether a majority of the customers associated with the cluster bought the new product or not, it is decorated with one of the two categories (for example, "bought" or "did not buy"). The annotation allows the results of clustering to be indirectly used for prediction. When a new pattern falls into a cluster, it is assigned to the category of that cluster.

A numerical modeling technique, such as the OLS technique may be used to directly build a model on the mixed data in conjunction with the signpost transformation. In this case, the numerical modeling technique does not use manual encoding and the result may improve if the full list of products under the field "other" is available.

Figure 5:
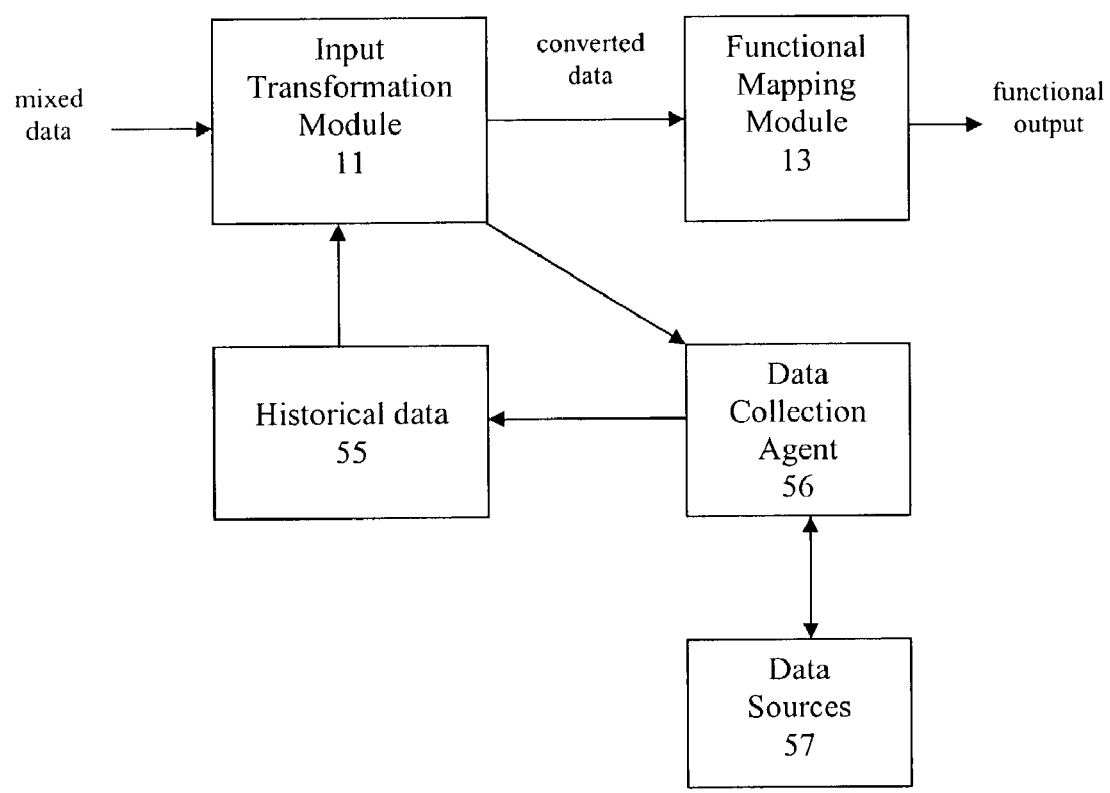
FIG. 5 shows a block diagram for a portion of a system for processing mixed data for a selected task, in accordance with another embodiment of the present application.

The methodologies described herein also may be applied to make predictions and recommendations in an enterprise model. FIG. 5 shows relevant portions of a system for processing mixed data for a selected task, according to another embodiment of the present application. Subsystem 50 includes input transformation module 11 and functional mapping module 13 which have the functions and features as described above. The subsystem 50 includes in addition a historical database 55, one or more data collection agents 56 and data sources 57. The data collection agent 56 collects data from the data sources 57 and stores the data in the historical database 55. Data collection may be continuous, periodic and/or upon command (from, for example, the input transformation module). The collected data may include in whole or in part mixed data. The data sources, in an enterprise model system, may include local machines and proxied devices (for example, a router in a network which assumes the identity of another device in the network) as well as external sources.

The input transformation module 11 learns the behavior of each device based on historical data collected by the data collection agent 56 and stored in the historical database 55, and develops a model of the device's behavior. The input transformation module 11 preferably has the feature of adaptive learning. Thus, the device model may be refined with additional collected data over time.

For example, the input transformation module 11 may be trained to process mixed data received from an external news source. Spikes and drops in enterprise resource usage may be tied historically to a presence of certain categories of headline news (for example, impending war, financial market crash, etc.). Accordingly, the strategy for allocating network resources may include monitoring newswire headlines of the day. The relevant data set is of course represented by mixed data. A training set of sample headlines with associated enterprise resources usage data may be classified into clusters associated with enterprise usage requirements, as indicated by historical data. Clustering is triggered by a historical tendency of headlines which contain similar keywords having a similar effect on the enterprise resource usage. Based on the sample headlines associated with a particular cluster, which may be annotated with an associated network resource requirement (determined, for example, using enterprise resources usage data associated with the sample headline mixed data), a news headline which falls in this cluster in consultation can be appropriately classified and trigger recommendation, to a network analyst, of an adjustment to a level/quantity of enterprise resources to be allocated.

The methodologies, apparatus and systems described herein may be applied to a large assortment of tasks in which mixed data is processed, although this disclosure describes a few exemplary embodiments in which the methodologies, apparatus and systems have been applied to select tasks. The specific embodiments described are illustrative, and many variations may be introduced on these embodiments without departing from the spirit of the disclosure or from the scope of the appended claims. Elements and/or features of different illustrative embodiments may be combined with each other and/or substituted for each other within the scope of this disclosure and appended claims.

Additional variations may be apparent to one of ordinary skill in the art from reading the following U.S. provisional applications, which are incorporated herein by reference:

(a) Ser. No. 60/374,064, filed Apr. 19, 2002 and entitled "PROCESSING MIXED NUMERIC AND/OR NON-NUMERIC DATA";

(b) Ser. No. 60/374,020, filed Apr. 19, 2002 and entitled "AUTOMATIC NEURAL-NET MODEL GENERATION AND MAINTENANCE";

(c) Ser. No. 60/374,024, filed Apr. 19, 2002 and entitled "VIEWING MULTI-DIMENSIONAL DATA THROUGH HIERARCHICAL VISUALIZATION";

(d) Ser. No. 60/374,041, filed Apr. 19, 2002 and entitled "METHOD AND APPARATUS FOR DISCOVERING EVOLUTIONARY CHANGES WITHIN A SYSTEM";

(e) Ser. No. 60/373,977, filed Apr. 19, 2002 and entitled "AUTOMATIC MODEL MAINTENANCE THROUGH LOCAL NETS"; and (f) Ser. No. 60/373,780, filed Apr. 19, 2002 and entitled "USING NEURAL NETWORKS FOR DATA MINING".

What is claimed is:

1. An apparatus for processing mixed data for a selected task, comprising:
a data collection agent comprising logic encoded in a computer-readable medium that when executed is operable to collect mixed data implemented in a plurality of encoding schemes, the mixed data collected from a plurality of data sources wherein the plurality of data sources comprises at least two unique data sources comprising at least two unique encodings;
a neural network comprising logic encoded in a computer-readable medium that when executed is operable to implement an input transformation module, the input transformation module adapted to:
determine a complexity associated with the mixed data, the complexity based on a number of dimensions associated with the encoded data and a desired functional output for the selected task;
upon determining the complexity is below a first threshold, transform the encoding into a first numerical encoding based on a pattern in the encoding;
upon determining the complexity is above the first threshold:
determine a distance metric for determining a distance between any two data points within a particular dimension of the encoding;
scale at one distance of at least one dimension;
cluster the mixed data based on the determined distance metric;
transform the encoding into a second numerical encoding using a signpost transformation that dynamically adjusts a level of detail based on the desired functional output for the selected task;
a functional link network comprising logic encoded in a computer readable medium that when executed is operable to process the transformed encoding to provide the functional output for the selected task; and
a memory module operable to store the functional output.

2. The apparatus of claim 1, wherein the input transformation module uses a signpost transformation that self adapts by adding nodes until the transformed data meets a criteria.

3. The apparatus of claim 2, wherein cluster centers are set as reference points and distances from a mixed data to the respective reference points correspond to dimensions of the converted data space.

4. The apparatus of claim 2, wherein the input transformation module is trained through clustering of a mixed data training set.

5. The apparatus of claim 4, wherein the input transformation module uses a supervised learning methodology.

6. The apparatus of claim 4, wherein the input transformation module uses a k-means methodology for determining cluster centers.

7. The apparatus of claim 4, wherein the input transformation module uses a k-medoids methodology for determining cluster centers.

8. The apparatus of claim 1, wherein the mixed data includes consumer profile information.

9. The apparatus of claim 1, wherein the converted data is in a numerical representation.

10. The apparatus of claim 1, wherein the mixed data corresponds to text.

11. The apparatus of claim 1, wherein the input transformation module learns to organize mixed data patterns into sets corresponding to a plurality of nodes, and respective outputs of the nodes correspond to said converted data.

12. The apparatus of claim 11, wherein each node has an associated cluster annotation function.

13. The apparatus of claim 11, wherein the learning is unsupervised.

14. The apparatus of claim 1, wherein the functional link network includes a computational model with at least one basis function, and
parameters of the at least one basis function are adjusted as the functional link network learns a training set of sample patterns associated with the selected task.

15. The apparatus of claim 14, wherein the functional link network includes an orthogonal functional link net.

16. The apparatus of claim 14, wherein the functional link network uses a regression technique for adjusting the parameters of the at least one basis function.

17. The apparatus of claim 16, wherein the at least one basis function includes a sigmoid.

18. The apparatus of claim 16, wherein the at least one basis function includes a wavelet.

19. The apparatus of claim 16, wherein the at least one basis function includes a radial basis function.

20. The apparatus of claim 16, wherein the at least one basis function includes a polynomial.

21. The apparatus of claim 14, wherein the learning by the functional link network is by a supervised, recursive least squares estimation method.

22. The apparatus of claim 14, wherein the functional link network includes a feed-forward net.

23. The apparatus of claim 22, wherein the feed-forward net is non-linear.

24. The apparatus of claim 22, wherein the feed-forward net learns by back-propagation of error.

25. The apparatus of claim 1, wherein the input transformation module and the functional link network comprise respective layers of a neural network.

26. The apparatus of claim 1, wherein the selected task is data mining.

27. The apparatus of claim 1, wherein the selected task is database searching.

28. The apparatus of claim 1, wherein the selected task is targeted marketing.

29. The apparatus of claim 1, wherein the selected task is computer virus detection.

30. The apparatus of claim 1, wherein the selected task is one of visualization, search, recall, prediction and classification.

31. The apparatus of claim 1:
wherein the plurality of data sources comprises at least one local machine and at least one additional source selected from among an external data source and a proxied data source; and further comprising a historical database operable to store mixed data collected by the data collection agent for subsequent transformation by the neural network.

32. The apparatus of claim 1, wherein the at least two unique types of mixed data encodings comprise at least two types of mixed data selected from the group consisting of a webpage, an email, a customer profile, purchase data, medical information, speech samples, and handwriting samples.

33. A computer-implemented method of processing mixed data for a selected task, comprising:
collecting mixed data implemented in a plurality of encoding schemes, the mixed data collected from a plurality of data sources wherein the plurality of data sources comprises at least two unique data sources comprising at least two unique types;
determining a complexity associated with the mixed data, the complexity based on a number of dimensions associated with the encoded data and a desired functional output for the selected task;
upon determining the complexity is below a first threshold, transforming the encoding into a first numerical encoding based on a pattern in the encoding;
upon determining the complexity is above the first threshold:
determining a distance metric for determining a distance between any two data points within a particular dimension of the encoding;
scaling at one distance of at least one dimension;
clustering the mixed data based on the determined distance metric;
transforming the encoding into a second numerical encoding using a signpost transformation that dynamically adjusts a level of detail based on the desired functional output for the selected task;
processing the transformed encoding to provide the functional output for the selected task; and
storing the functional output.

34. The method of claim 33, wherein the mixed data is transformed into converted data through a signpost transformation that self-adapts by adding nodes until the transformed data meets a criteria.

35. The method of claim 34, wherein cluster centers are set as reference points and distances from a mixed data to the respective reference points correspond to dimensions of the converted data space.

36. The method of claim 33, wherein the mixed data is transformed into converted data through an encoding methodology.

37. The method of claim 36, wherein the mixed data includes consumer profile information.

38. A program storage device readable by a machine, tangibly embodying a program of instructions executable by the machine, when executed by the machine the program of instruction operable to:
collect mixed data implemented in a plurality of encoding schemes, the mixed data collected from a plurality of data sources wherein the plurality of data sources comprises at least two unique data sources comprising at least two unique encodings;
determine a complexity associated with the mixed data, the complexity based on a number of dimensions associated with the encoded data and a desired functional output for the selected task;
upon determining the complexity is below a first threshold, transform the encoding into a first numerical encoding based on a pattern in the encoding;
upon determining the complexity is above the first threshold:
determine a distance metric for determining a distance between any two data points within a particular dimension of the encoding;
scale at one distance of at least one dimension;
cluster the mixed data based on the determined distance metric;
transform the encoding into a second numerical encoding using a signpost transformation that dynamically adjusts a level of detail based on the desired functional output for the selected task;
process the transformed encoding to provide the functional output for the selected task; and
store the functional output.

39. A computing system, comprising:
a processor; and
a program storage device readable by the computer system, tangibly embodying a program of instructions executable by the processor to:
collect mixed data implemented in a plurality of encoding schemes, the mixed data collected from a plurality of data sources wherein the plurality of data sources comprises at least two unique data sources comprising at least two unique types of mixed data;
determine a complexity associated with the mixed data, the complexity based on a number of dimensions associated with the encoded data and a desired functional output for the selected task;
upon determining the complexity is below a first threshold, transform the encoding into a first numerical encoding based on a pattern in the encoding;
upon determining the complexity is above the first threshold:
determine a distance metric for determining a distance between any two data points within a particular dimension of the encoding;
scale at one distance of at least one dimension;

cluster the mixed data based on the determined distance metric;
transform the encoding into a second numerical encoding using a signpost transformation that dynamically adjusts a level of detail based on the desired functional output for the selected task;
process the transformed data to provide the functional output for the selected task; and
store the functional output.

40. The apparatus of claim 1, wherein:
the functional link network is updated based on transforming the mixed data; and the memory module is further operable to store the updated functional link network.

41. The apparatus of claim 1, wherein the distance metric comprises:

$$d = \frac{\sum_{i}^{A} w_{Ai} + \sum_{j}^{B} w_{Bj} - \sum_{k}^{A \cap B} (w_{Ak} + w_{Bk})}{\sum_{i}^{A} w_{Ai} + \sum_{j}^{B} w_{Bj} - \frac{1}{2}\sum_{k}^{A \cap B} (w_{Ak} + w_{Bk})}.$$

* * * * *